H. J. BATCHELDER.
Rolls for Horseshoe Blanks.
No. 234,942. Patented Nov. 30, 1880.
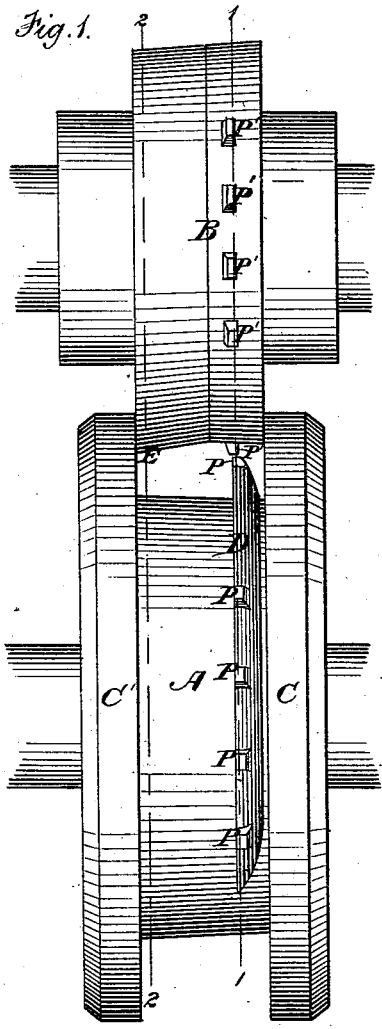
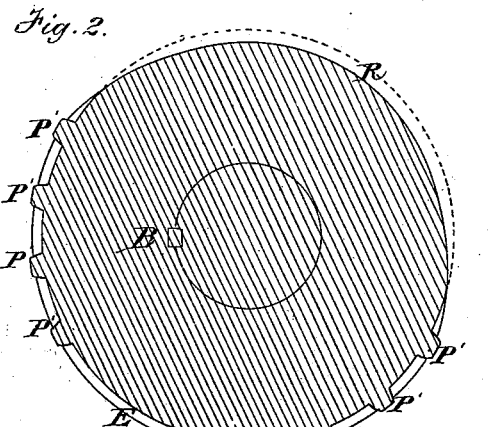
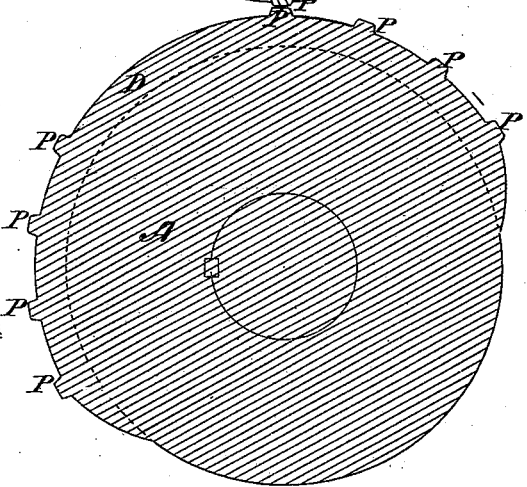
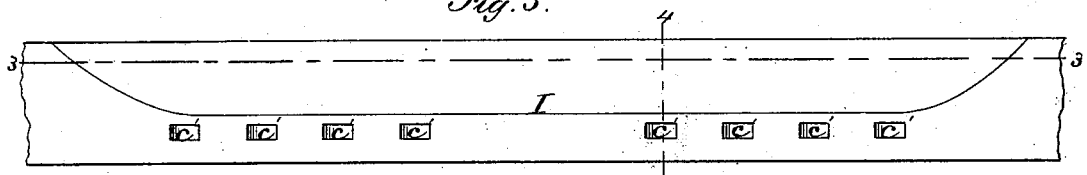
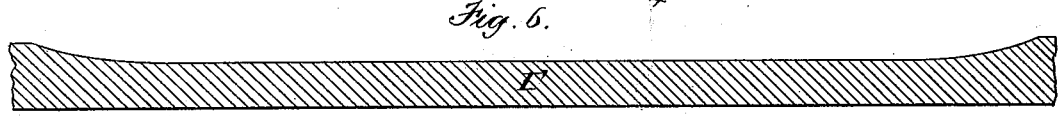
Witnesses
A. E. Drinson
H. E. Brown
Inventor
H. J. Batchelder
by Wright & Brown
Attys.

H. J. BATCHELDER.
Rolls for Horseshoe Blanks.
No. 234,942. Patented Nov. 30, 1880.
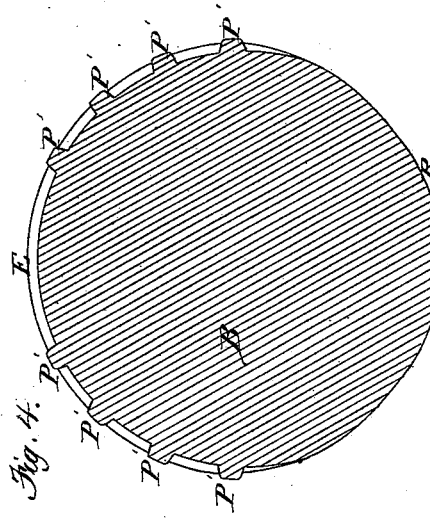
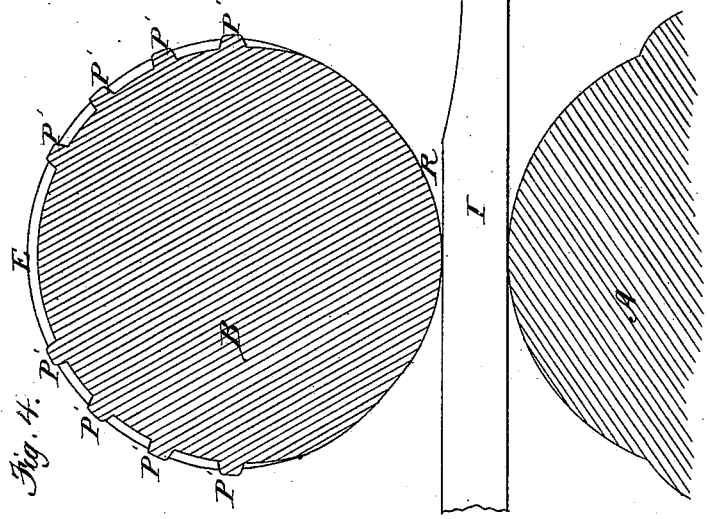
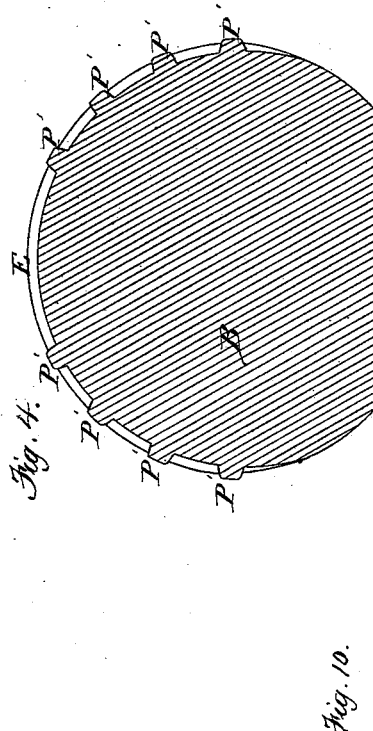
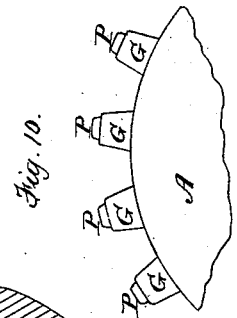
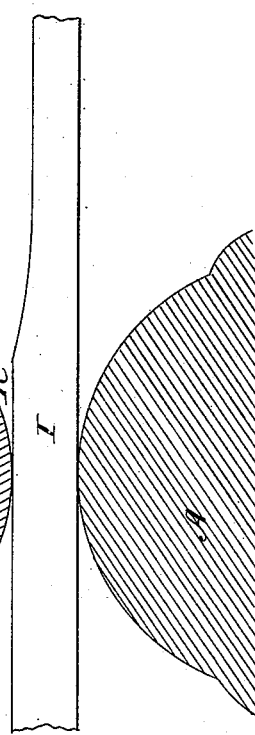
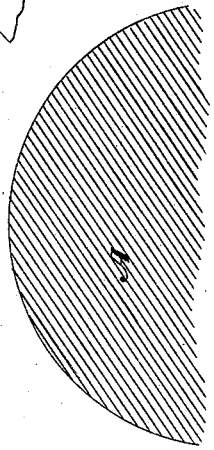
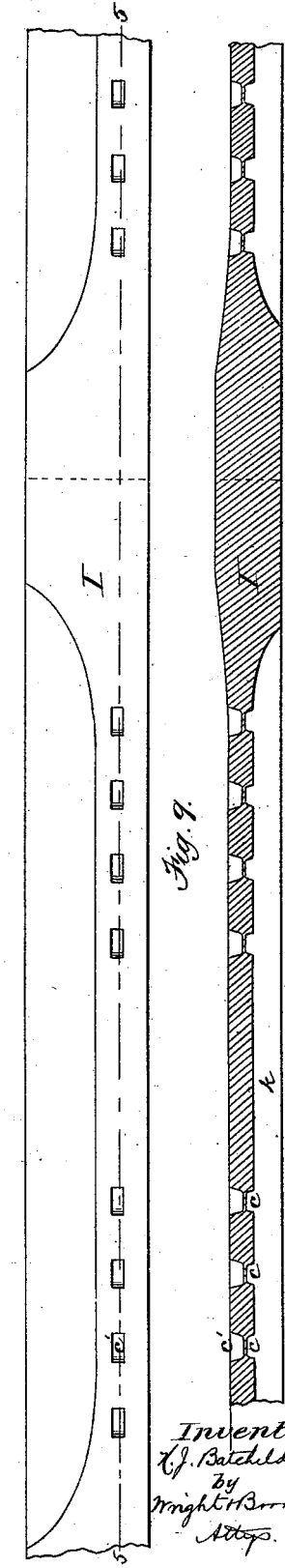

UNITED STATES PATENT OFFICE.

HAZEN J. BATCHELDER, OF CATASAUQUA, PENNSYLVANIA, ASSIGNOR, BY MESNE ASSIGNMENTS, TO THEODORE S. VERY, OF BOSTON, MASS.

ROLLS FOR HORSESHOE-BLANKS.

SPECIFICATION forming part of Letters Patent No. 234,942, dated November 30, 1880.

Application filed July 26, 1877.

*To all whom it may concern:*

Be it known that I, HAZEN J. BATCHELDER, of Catasauqua, in the county of Lehigh and State of Pennsylvania, have invented certain Improvements in Rolls for Making Horseshoe-Blanks, of which the following is a specification.

In the accompanying drawings, forming a part of this specification, Figure 1 represents a front view of a pair of rolls embodying my invention. Fig. 2 represents a section on line 1 1, Fig. 1. Fig. 3 represents a section on line 2 2, Fig. 1. Fig. 4 represents a section on line 1 1, Fig. 1, showing the rolls partially rotated from the position shown in Figs. 1 and 2. Fig. 5 represents a top view of a portion of a blank after the same has been subjected to the action of the rolls. Fig. 6 represents a section on line 3 3, Fig. 5. Fig. 7 represents a section on line 4 4, Fig. 5. Fig. 8 represents a top view of a blank, showing the thickened portions from which the heel-calks are subsequently formed. Fig. 9 represents a section on line 5 5, Fig. 8. Fig. 10 represents a detached view of a modification.

This invention has for its object to produce a pair of rolls for rolling horseshoe-blanks which are adapted to punch the bar from two opposite sides in such manner as to form a series of cavities on each side, the series of one side coinciding with those of the other side, and being separated therefrom only by thin films or webs of metal, so that when said films or webs are removed continuous nail-holes will be formed extending through the bar, said holes being inclined transversely of the bar.

The invention also has for its object to produce a straight bar, consisting of a series of horseshoe-blanks, which is punched on two opposite sides.

To these ends my invention consists in the peculiar construction of the rolls and in a bar composed of a series of horseshoe-blanks and punched on two sides, as an article of manufacture, all of which I will now proceed to describe.

In the drawings, A B represent my improved rolls, which are located in suitable bearings and geared so that they will be rotated positively in opposite directions. The roll A is provided with flanges C C', and its periphery between these flanges has the form, preferably, of a conic frustum, increasing in diameter from the flange C to the flange C'. These flanges C C' prevent lateral splaying of the metal being rolled and condense it longitudinally. They also prevent the formation of fins, which are always formed by the use of dies. Hence with my rolls I am enabled to produce a bar free of fins and ready for immediate use in forming the shoes, simply requiring to be bent to shape and the proper calks applied.

D represents a creasing-die located on the periphery of the roll A. The die D is adapted to form an uninterrupted crease or groove, $k$, in a bar, I, every time the roll A revolves, the bar passing between the rolls A B, and these creases are so spaced or separated from each other that each constitutes the crease for one blank of the series, said crease extending around the toe when the blank is bent into a shoe. The die D is provided with punches P, arranged in two series, these punches being so located as to form cavities $c$ in one side of the bar I, these cavities extending into the bar from the creases $k$.

The roll B fits somewhat closely between the flanges of the roll A, as shown in Fig. 1, and is provided on its periphery with punches P', which are so arranged as to coincide with the punches P and form cavities $c'$ in the bar I, these cavities being opposite the cavities $c$, as shown in Fig. 9, and separated from the latter only by thin films or webs of metal, by the removal of which the cavities $c$ $c'$ are united and form nail-holes. The inclination of the periphery of the roll A causes it to support the bar I in an inclined position. The die D is inclined or beveled on the side adjacent to the flange C, and its opposite side is vertical, and consequently stands at an acute angle with the transverse surface of the roll A, as shown in Fig. 1. By this construction the die D and its punches P are caused to enter the bar I obliquely to the bottom surface thereof, and thus form creases $k$ and cavities $c$, which are inclined transversely of the bar.

The punches P' are located on a vertical plane which is slightly separated from and parallel with the vertical plane on which the punches P and die D are located, the arrangement of the punches P' being such that the cavities c' formed thereby will be inclined in continuation of the cavities c, as shown in Fig. 7, so that when the cavities c and c' are connected by the removal of the separating-webs the continuous holes will have a regular inclination transversely of the bar, this inclination, when the bar is bent into shape as a shoe, corresponding to the inclination of the shell of a horse's hoof, so as to guide the shoe-nails in the proper direction.

The roll B is reduced on one side between the two series of punches P', as shown at R, Figs. 2 and 4, this reduced portion giving the bar an increased thickness at the points where the bar is to be severed or cut up into blanks, as shown in Fig. 8 and 9, the point where the bar is to be cut being indicated in said figures by dotted lines. When the bar is thus cut each length is adapted to be bent into a shoe, and is thicker at its ends than along the intermediate portion. These ends afford material for the heel-calks.

The roll B is provided with a beveled enlargement or projection, E, on the side opposite the reduced portion, this projection being by the side of the punches P', and is adapted to impart a bevel or seat to the upper surface of the bar, as shown in Figs 5 and 6.

I do not limit myself to the described shape of the roll B with reference to beveling or seating the bar and forming the thickened portions, as the periphery of the roll may be made perfectly concentric with its axis, if desired.

The creasing-die D may be dispensed with, and the punches P may be located on countersinking-dies G, as shown in Fig. 10, each die G being adapted to form an enlarged cavity adapted to receive the head of a horseshoe-nail.

The punches P P' may be arranged to make vertical instead of inclined cavities in the bar without departing from the spirit of my invention.

I prefer to make the roll B inclined or tapered transversely, so that its lower surface will be parallel with the upper surface of the roll A along the vertical plane of the axes of the two rolls, excepting where the enlargement R occurs.

I claim as my invention—

1. A pair of rolls, A B, having punches P P', adapted to enter a bar of iron from opposite sides and form coinciding cavities which are inclined transversely, as set forth.

2. The roll B, having the die or enlargement E and punches P', combined with the roll A, having punches P, as set forth.

3. As an article of manufacture, a bar, I, composed of a series of horseshoe-blanks, each blank having coinciding cavities formed in two opposite sides, as set forth.

In testimony whereof I have signed my name to this specification in the presence of two subscribing witnesses.

HAZEN J. BATCHELDER.

Witnesses:
  C. F. BROWN,
  A. E. DENISON.